United States Patent Office 3,463,966
Patented Aug. 26, 1969

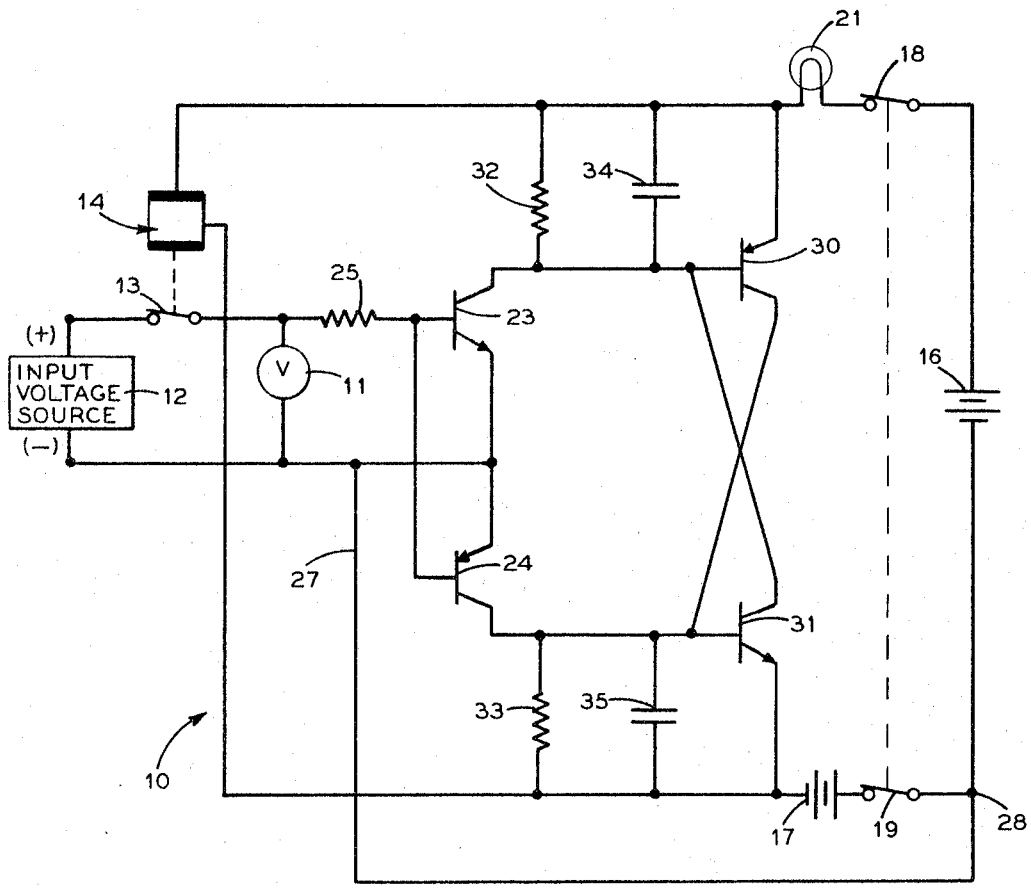

3,463,966
FAIL-SAFE CIRCUITS FOR PROTECTING METERS AND THE LIKE AGAINST BIPOLAR VOLTAGE OVERLOADS
Charles E. Evans, Scotch Plains, and John Nagy, Jr., Union, N.J., assignors to Weston Instruments, Inc., Newark, N.J., a corporation of Delaware
Filed Sept. 14, 1967, Ser. No. 667,692
Int. Cl. H02h 3/28
U.S. Cl. 317—31                                    7 Claims

ABSTRACT OF THE DISCLOSURE

A fail-safe circuit is disclosed for protecting meter circuits and the like against bipolar voltage overloads. Among the components included in the circuit are (1) a voltage overload detection circuit connected in parallel with the meter circuit input terminals for producing an output signal when a voltage overload condition is detected; (2) a relay which is normally maintained energized by a relay energizing source so that the meter circuit terminals are normally maintained connected to an input voltage source through closed relay contacts; (3) a switching circuit connected in parallel with the relay which circuit may be triggered into turning on by an output signal from the detection circuit; and (4) an alarm or overload indicating device for providing a bilevel output signal. The latter device connects the relay and the relay energizing source and normally provides a low level alarm signal which may or may not be detectable but produces a recognizably higher level alarm signal when the switching circuit is triggered into turning on to shunt and thereby de-energize the relay. When the relay de-energizes, it opens its hitherto closed contacts to disconnect the input voltage source from the meter. Failure of the device caused by, for example, its burning out, and/or failure of the relay energizing source also operates to de-energize the relay.

---

This invention relates generally to meter protection circuits and, more particularly, to a fail-safe circuit for protecting an electrical meter against bipolar voltage overloads.

Electrical meters that measure the magnitude of voltages or currents are often provided with overloaded protection circuits. Such circuits typically operate on the principle of disconnecting the meter input terminals from the voltage or current source when a voltage or current overload condition is detected by the protection circuit. Some type of alarm device, for example, a lamp which illuminates to provide a visual indication of an overload condition is conventionally incorporated in the protection circuit. As a safeguard against the possibility that the meter terminals might be inadvertently polarity reverse-connected to the source of measured voltage and against the possibility that the overload voltage might be either a positive or a negative voltage, the protection circuit preferably should be responsive to bipolar overload voltages. In addition, the protection circuit preferably should be fail-safe, that is, the protection circuit should prevent the meter from being overloaded in the event the overload indicating device fails by reason of, for example, device burn-out or through the failure of the protection circuit power source. When the overload indicating device takes the form of an incandescent lamp or glow tube having a comparatively short life span compared to the life span of the other components comprising the protection circuit, it is important that provision also be made to safeguard against a premature failure of the indicating device.

It is an object of this invention to provide a fail-safe voltage overload protection circuit for electrical meters and the like.

More specifically, it is an object of this invention to provide a voltage overload indicating and protection circuit that protects an electrical meter against bipolar voltage overloads and, additionally, prevents the meter from being overloaded in the event a failure occurs in the indicating portion of the circuit.

According to this invention, a fail-safe voltage overload protection circuit is provided for protecting an electrical meter and associated circuitry against bipolar voltage overloads applied to a pair of meter terminals. The circuit includes a detection circuit comprising a first pair of transistors of complementary conductivity type. The base electrodes of these transistors are commonly connected to one meter terminal and their emitter electrodes are commonly connected to the other meter terminal. The transistors are selected such that one of the transistors is rendered conductive by the application of an input voltage to the meter terminals having orders of magnitude greater than the rated full scale meter voltage; the particular transistor that is rendered conductive being determined by the polarity of the input voltage. Connected to the collector electrodes of the first transistor pair are the base electrodes of a dual-input dual-output switch comprising a pair of cross-coupled or "hook-connected" transistors of complementary conductivity type. The dual input-output switch is normally biased into turning off but turns on when either transistor of the first transistor pair turns on. The switch also includes a pair of emitter electrodes to which opposite ends of a coil of a relay are connected, the relay being maintained normally energized by current flow through its coil from a source of electrical potential coupled to the emitter electrodes of the switch through a voltage overload alarm. Since the meter which is protected by the circuit of this invention is typically visually monitored or read out, the alarm typically takes the form of an incandescent lamp or glow tube which illuminates dimly, if at all, while the relay draws current. Contacts under the control of the relay close to couple the meter input terminal to the input voltage as long as the relay remains energized but these contacts open when the relay de-energizes to disconnect the input voltage source from one of the meter terminals.

When a voltage overload condition is detected by one of the transistors of the first transistor pair, the semiconductor switch turns on to short circuit the relay coil and open the contacts to open circuit the meter circuit input terminals. With the relay short circuited, the alarm energizes to provide an indication of a voltage overload condition. In the event the alarm burns out or the source of electrical potential fails, the circuit between the source of potential and the relay coil opens to cause de-energization of the relay and consequent decoupling of the meter terminals from the input voltage source. Thus, the circuit of this invention provides a fail-safe mode of voltage (or current) overload protection.

Referring now to the single drawing for a more detailed understanding of the present invention, the fail-safe voltage overload protection circuit is designated generally by the numeral 10 and is utilized to protect a voltmeter 11 from bipolar voltage overloads of, for example, 5 or more times greater than the rated full scale voltage of the meter. For example, if the meter 11 is a conventional D.C. millivoltmeter having a 100 millivolt-10 microampere movement, the circuit 10 may be designed to respond to D.C. voltage overloads of 0.5 volt and greater.

The input voltage which is to be measured by the meter 11 may be derived from any suitable source designated generally by the numeral 12. The source 12 voltage is applied to the meter through a single pole-single switch 13 which operates to open and close an associated contact pair under the control of a D.C. current-controlled relay 14. The relay 14 is normally energized and the switch 13 thus closed so that the voltage of the source 12 is applied to the two input terminals of the meter 11. Upon de-energization of the relay, the switch opens to disconnect the meter 11 from the source 12.

The relay 14 receives energizing current from, for example, a pair of batteries 16 and 17 connected in series so as to be voltage adding. A pair of single pole-single throw switches 18 and 19 are ganged together so that the opening or closing of one switch effects the corresponding opening or closing of the other. An indicating lamp 21 has one side thereof connected at all times to the upper end of the coil of the relay 14 and the other side connected to a contact of the switch 18. With the switches 18 and 19 in their normally closed positions, the relay 14 is energized by D.C. current flowing from the batteries 16 and 17. The lamp 21 is selected so that the current which is drawn by the relay 14 under steady state conditions of energization either prevents the lamp 21 from glowing, or alternately, permits only a very low level of lamp illumination, which may be readily distinguished from the level of illumination produced when the relay 14 is shorted out. When a voltage overload sufficient to trigger the circuit 10 is detected by the circuit, the relay 14 is shorted out and causes an increase in current flow through the lamp 21 with the result that the lamp 21 glows very brightly to provide a readily observable visual indication of the voltage overload condition. In addition, it will be apparent that should the lamp 21 burn out, the series circuit incorporating the batteries 16 and 17 opens and causes immediate de-energization of the relay 14 and consequent opening of the switch 13 and disconnection of the voltage source 12 from the meter 11.

The circuitry for effecting the shorting out of the relay 14 under an overload condition includes a pair of transistors 23 and 24 of opposite conductivity type with the base electrodes of these transistors being connected together to one terminal of a current-limiting resistor 25. The current-limiting resistor 25 not only serves as a current-limiting resistor for the transistors 23 and 24 but further serves to limit current flow from the circuit 10 to the meter 11 when either transistor 24 or 23, respectively, is rendered conductive. The transistors 23 and 24 require approximately 0.5 volt base-to-emitter voltage before they are triggered into conduction; the transistor 23 turning on when +0.5 volt is applied to its base electrode and, conversely, the transistor 24 turning on when −0.5 volt is applied to its base electrode. The emitter electrodes of transistors 23 and 24 are connected by a lead 27 to a terminal 28, the terminal 28 typically floating at virtually ground potential. Alternatively, the emitter electrodes of these transistors may be connected to a bias source which may be adjusted to set the threshold level of transistor conduction. The bias source may include temperature compensation circuitry (not shown) for compensating temperature effects on the base-to-emitter voltages of the transistors 23 and 24.

Normally, the meter 11 will tolerate without deleterious effect a moderate amount of voltage overload; for example, conventional millivoltmeters usually tolerate slightly more than 5 times their rated full scale voltage. Thus, a conventional 100 millivolt–10 microampere movement will usually tolerate more than 0.5 volt, the 0.5 volt level being substantially the same voltage level required to turn on the transistor 23 or 24. Therefore, for a voltage overload on the order of 5 times the nominal full scale meter input voltage, one of the transistors 23 or 24 will turn on depending upon the polarity of the overload input voltage.

The collector electrodes of the transistors 23 and 24 are connected to base electrodes of transistors 30 and 31, respectively, of complementary conductivity type, and the collector electrodes of the transistors 30 and 31 cross-coupled to the base electrodes of one another to form a conventional dual input-dual output "hook-connected" transistor switch. The transistors 30 and 31 are normally in a state of nonconduction but the application of a negative potential to the base of the transistor 30 or the application of a positive potential to the base of the transistor 31 will cause initial conduction of that particular transistor followed by conduction of the other transistor of the switch. Thus, if a negative potential of magnitude greater than the negative threshold of −0.5 volt is applied to the base of the transistor 24, this transistor turns on and generates a positive-going voltage transition at its collector electrode which triggers the transistor 31 into turning on. When the transistor 31 turns on, its collector voltage drops sharply causing the base-to-emitter voltage of the transistor 30 to go sufficiently negative to cause conduction of the latter transistor. When the transistor 30 turns on, its collector electrode supplies the base current for the transistor 31 that maintains the latter transistor in its turned-on state. The aforedescribed process is regenerative and results in both hook-connected transistors 30 and 31 being turned-on at practically the same time and remaining turned on until circuit reset is effected. Conversely, the application of a positive potential of magnitude greater than the positive threshold of +0.5 volt to the base of the transistor 23 will cause this transistor to turn on and the negative voltage which is produced at its collector electrode causes an initial turning on of the transistor 30 followed immediately by the turning on of the transistor 31.

Collector resistors 32 and 33 of the transistors 23 and 24, respectively, are utilized to prevent false triggering of the transistors 30 and 31, respectively, by leakage currents which may flow through the transistors 23 and 24. Capacitors 34 and 35 serve to limit the bandwidth of the circuit 10 by slowing down the response time of the circuit to sharp input pulses which might otherwise cause false triggering of the transistors 23 or 24.

When the transistors 30 and 31 turn on, substantially all of the current from the batteries 16 and 17 flows through these transistors and virtually no current flows through the relay 14. As a result, the normally energized relay 14 deenergizes and opens the switch 13. In addition, the level of brightness of the indicating lamp 21 increases significantly to reflect the fact that the relay 14 is now de-energized and the switch 13 open. The increase in the level of illumination of the lamp 21 serves to alert one monitoring the protection circuit 10 that an overload condition has been detected. Once the transistors 30 and 31 are turned on, to reset the circuit 10 requires that the switches 18 and 19 be opened to disconnect the batteries 16 and 17 from the pair of hook-connected transistors. Thus, the circuit 10 also incorporates the additional safety feature of requiring, for example, an operator to manually reset the circuit after an overload condition has been detected.

In one specific embodiment of the aforedescribed invention, a protection circuit having the following component values satisfactorily protected a 100 millivolt–10 microampere meter movement from a voltage overload of 5 or more times the rated 100 millivolt full scale vale of the meter.

Relay 14 _____ Model 11–F–550–G/SIL; manufactured by Sigma Instruments, Inc., Braintree, Mass.
Batteries 16 and 17 ____ 6 volts each.
Lamp 21 _____ 6 volts/0.04 ampere.
Transistors 23 and 31 __ Type 2N27212.
Transistors 24 and 30 __ Type 2N3638.
Resistors 25, 32 and 33 _ 39K ohms each.
Capacitors 34 and 35 __ 0.1 microfarad each.

While there has been described what is at present considered to be one embodiment of this invention, it will be obvious to those skilled in the art that various changes and modifications may be made in the instrument without departing from the invention, and it is, therefore, intended to cover all such changes and modifications as fall within the true spirit and scope of the invention.

What is claimed is:

1. A fail-safe circuit for protecting an electrical apparatus having two input terminals against bipolar input voltage overloads, the circuit comprising, means electrically energizable to connect one of the apparatus input terminals to an input voltage source, a source of electrical power for energizing said means, an alarm device series connecting the electrical power source to said means, said alarm device producing a relatively low level alarm signal when electrical power is drawn therefrom by said means and providing a higher level alarm signal when said means is short circuited, a circuit connected across the input terminals of the apparatus for detecting input voltage overloads, the detecting circuit producing an output signal in response to the amplitude of the input voltage exceeding a predetermined threshold level, and a switching circuit connected in parallel with said means and responsive to an output signal from said detecting circuit for short circuiting said means and causing said means to disconnect said one of the apparatus input terminals from said input voltage source.

2. The circuit as claimed in claim 1, wherein the electrical power source includes a pair of output terminals and wherein said circuit for detecting input voltage overloads comprises a current limiting resistor and a pair of transistors of opposite conductivity type, each transistor of the transistor pair including a base, an emitter and a collector electrode, the two base electrodes of the transistor pair being connected through said resistor to one input terminal of the apparatus, the two emitter electrodes of the transistor pair being connected to the other input terminal of the apparatus, a load circuit comprising a parallel combination of a resistor and a capacitor connected between each collector electrode of said transistor pair and an output terminal of the electrical power source, the output signal of said detecting circuit appearing at one of said collector electrodes.

3. The circuit as claimed in claim 2, wherein said switching circuit comprises a pair of transistors of complementary conductivity type, each transistor having a base, an emitter and a collector electrode, the base electrode of each transistor being connected to the collector electrode of the other transistor and to the collector electrode of a transistor of the detecting circuit of opposite conductivity type, the emitter electrode of one of the switching circuit transistors being connected to an output terminal of the power source through said alarm device.

4. The circuit as claimed in claim 3 which additionally comprises at least one normally closed switch for electrically connecting the emitter electrodes of the switching circuit transistors to said power source.

5. The circuit as claimed in claim 1, wherein the apparatus comprises a voltmeter.

6. A fail-safe circuit for protecting an electrical meter having at least two meter terminals against bipolar voltage overloads applied to the meter terminals the circuit comprising, a first pair of transistors of complementary conductivity type, each transistor of the first pair including first and second electrodes, the first electrodes of the first transistor pair being connected to one of the meter terminals and the second electrodes of the first transistor pair being connected to the other meter terminal, one of the transistors of the first transistor pair being rendered conductive in response to a meter voltage of one polarity having an amplitude greater than a normal or rated full scale meter voltage, a semi-conductor switching device including a pair of input terminals and a pair of output terminals, means coupling the input terminals of the switching device to different ones of the second electrodes of said first transistor pair, said switching device being normally in a first state but being driven into a second state in response to the conduction of either transistor of said first transistor pair, a source of electrical power for energizing the circuit, means connected in series with said source of electrical power and said means controlled by said switching means for providing a signal indication as to the state of the last-mentioned means, and means controlled by said switching device for (1) coupling one of the meter terminals to the input voltage source when said switching device is in said first state and (2) decoupling the one meter terminal from the input voltage source when said switching device is driven into said second state.

7. A fail-safe circuit for protecting an electrical meter having at least two meter input terminals against bipolar input voltage overloads applied to the meter input terminals, the circuit comprising a first pair of transistors of complementary conductivity type, each transistor of the first pair including a base electrode and an emitter electrode, the two base electrodes of the first transistor pair being connected to one of the meter input terminals and the two emitter electrodes of said first transistor pair being connected to the other meter input terminal, one of the transistors comprising the first transistor pair saturating in response to a meter input voltage from an input voltage source having an amplitude greater than the nominal or rated full scale voltage of the meter, a semiconductor switching device including a pair of bese electrodes and a pair of emitter electrodes, the base electrodes of said device being connected to different ones of said collector electrodes of said first transistor pair, said device being in a normally nonconductive state but being triggered into a conductive state by either transistor of said first transistor pair saturating, a normally energized relay connected in parallel with the emitter electrodes of said device so that said relay is shorted and de-energized when said device is triggered into a conductive state, at least one switch under the control of said relay for coupling and decoupling at least one of the two meter input terminals, respectively, to and from the input voltage source, said switch coupling the meter to the said input voltage source when said relay energizes and decoupling the meter from said input voltage source when said relay de-energizes, a source of electrical power for energizing the circuit, and a voltage overload indicating lamp having two terminals, one terminal connected to the power source and the other terminal connected to one side of the relay, the lamp (1) illuminating when said device is triggered into a conductive state to provide a visual indication of a meter overload condition and (2) de-energizing said relay in the event of lamp burnout.

References Cited

UNITED STATES PATENTS 3,243,658  3/1966  Blackburn _____ 317—31
3,363,167  1/1968  Szabo et al. _____ 317—31 X JOHN F. COUCH, Primary Examiner J. D. TRAMMELL, Assistant Examiner U.S. Cl. X.R.

317—33, 54, 148.5; 324—110; 340—248